United States Patent [19]
Bobo

[11] 3,901,280
[45] Aug. 26, 1975

[54] PIPELINE OBTURATOR DEVICE

[76] Inventor: Frank E. Bobo, 212 Algee St., Tiptonville, Tenn. 38079

[22] Filed: July 19, 1974

[21] Appl. No.: 490,001

[52] U.S. Cl. ..................... 138/89; 138/97; 254/131
[51] Int. Cl.² .......................................... F16L 55/00
[58] Field of Search ............................. 137/15, 315; 138/89–99; 254/131; 29/257

[56] References Cited
UNITED STATES PATENTS

| | | | |
|---|---|---|---|
| 2,504,881 | 4/1950 | Russell | 138/99 |
| 2,526,238 | 10/1950 | Kendall | 138/89 |
| 2,977,992 | 4/1961 | Jensen | 138/89 |
| 3,487,857 | 1/1970 | Lee | 138/99 |

*Primary Examiner*—Houston S. Bell, Jr.
*Attorney, Agent, or Firm*—John R. Walker, III

[57] ABSTRACT

An obturator device for rapid sealable engagement with an inadvertently severed fluid delivery pipeline, e.g., the pipeline may be actively delivering natural gas or the like. The device includes a cap member having a soft sealing compound therein for sealable engagement with the end of the pipeline. A lever is provided which fixedly supports the cap member enabling the necessary pressure to be applied to the cap member to sealably close off the severed end of the pipeline. Provisions are included for properly supporting the lever while force is applied thereto, i.e., the lever is braced by structure which is adapted to rapidly grasp the pipeline. Lock structure is included to hold the lever in a rigid position subsequent to the cap member being sealably positioned.

4 Claims, 5 Drawing Figures

PATENTED AUG 26 1975    3,901,280
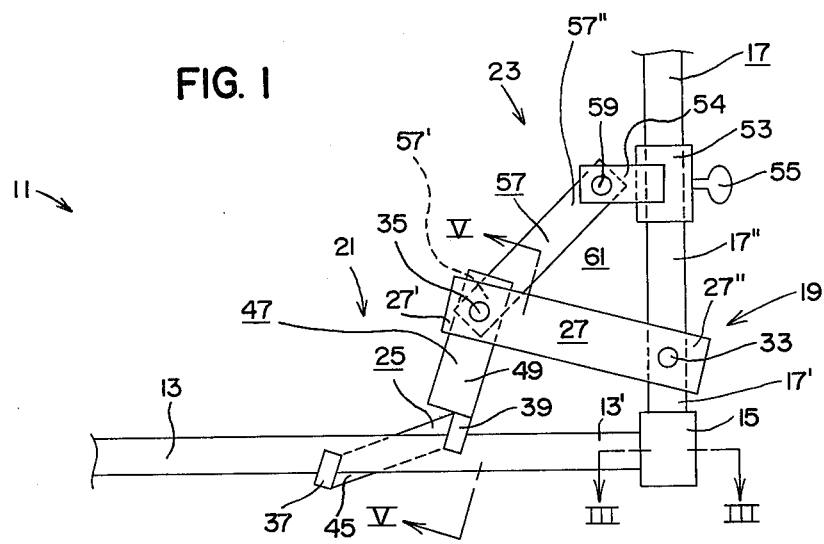
FIG. 1
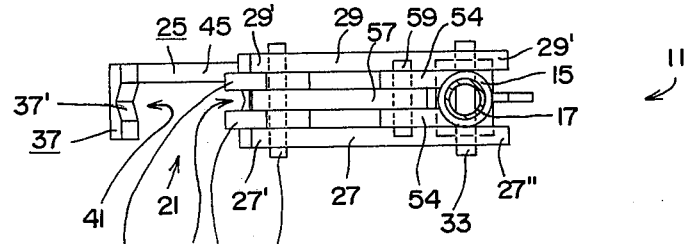
FIG. 2
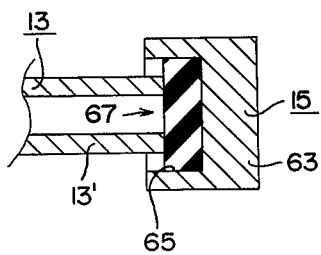
FIG. 3
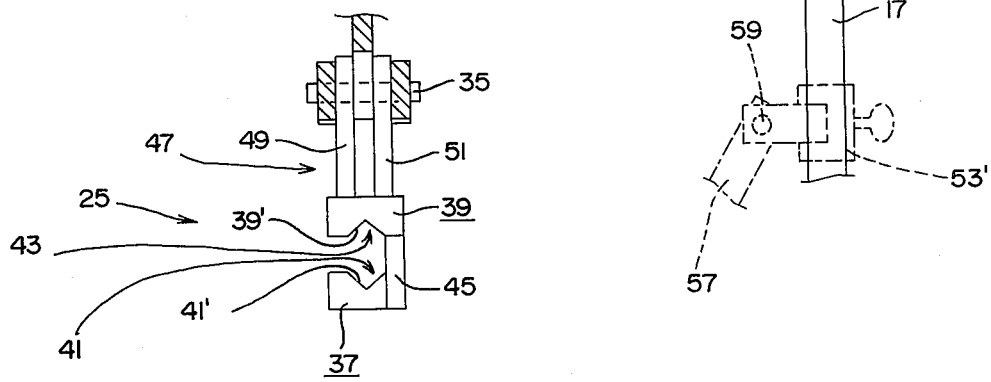
FIG. 5
FIG. 4

PIPELINE OBTURATOR DEVICE

BACKGROUND OF THE INVENTION

1. Field of the Invention

This invention relates to the field of pipeline obturator devices.

2. Description of the Prior Art

Numerous devices have been conceived and patented for closing inadvertently severed piplines. Certain of these prior devices are particularly directed towards repairing transverse openings in a pipeline, especially plastic pipeline and the like. Applicant is aware of the following U.S. patents: the Gallaher, Pat. No. 1,822,141; the Maisch, Pat. No. 2,937,666; the Jensen, Pat. No. 2,977,992; the Lee, Pat. No. 3,487,857; and the Black, Pat. No. 3,117,904 and 3,171,419. By and large, the prior devices depend upon various configurations of an expandable plug which is inserted into the open end of the pipeline. These sealing devices are difficult to install since the resistance offered by the fluid emanating from the severed end of the pipeline is difficult, if not impossible, to overcome. Additionally, these devices, for the most part, are rather complex, hence costly to manufacture. Further, another disadvantage to these prior devices is that they do not lend themselves to being rapidly attached to the pipeline. It should be pointed out that time is of the essence in closing certain severed pipelines, e.g., particularly in the event the pipeline is actively delivering natural gas or the like. The wastefulness of the energy and the monetary loss of the product certainly are important incentives toward expediting the closing of the severed pipeline. However, perhaps the most important factor in desiring to rapidly close the severed pipeline is the safety factor. The explicit hazards of natural gas are well known, therefore, it is believed to be unnecessary to expound further thereon.

SUMMARY OF THE INVENTION

The present invention is directed towards overcoming the disadvantages and problems relative to previous pipeline obturator devices. The concept of the present invention is to provide a pipeline obturator device that may be rapidly attached to an inadvertently severed active fluid delivery rigid pipeline, e.g., the pipeline may actively be delivering natural gas or the like. The device includes a cap member for sealable engagement with the end of the pipeline. The cap member preferably is equipped with a resilient insert for sealably engaging the jagged end of the pipeline. A lever is included for applying leverage to the cap member. The lever is provided with a fulcrum for enabling optimum force to be developed by the lever to overcome the resistance offered by the fluid emanating from the severed end of the pipeline and to urge the cap member sealably against the jagged severed end thereof. Brace structure is also included for grasping the pipeline and for fixedly supporting the fulcrum as the lever is manually operated, i.e., the lever is braced by structure which is adapted to rapidly grasp the pipeline. Lock structure is included to hold the lever in a rigid position subsequent to the cap member being sealably positioned.

DESCRIPTION OF THE DRAWING

FIG. 1 is a side elevational view of the pipeline obturator device of the present invention shown suitably attached to a pipeline.

FIG. 2 is a top view looking down on the device with the pipeline being removed.

FIG. 3 is a sectional view taken as on the line III—III of FIG. 1.

FIG. 4 depicts the lock structure of the present invention.

FIG. 5 is a sectional view taken as on the line V—V of FIG. 1.

DESCRIPTION OF THE PREFERRED EMBODIMENT

The pipeline obturator device 11 of the present invention is intended to be used for rapid sealable engagement with a severed active fluid delivery rigid pipeline 13, e.g., the pipeline 13 may be actively delivering natural gas or any other gaseous or liquid fluid. The device 11 generally comprises cap means 15 for sealably engaging the severed end 13' of the pipeline and lever means 17 for applying leverage to the cap means 15. The cap means 15 is fixedly attached, as by welding or the like, to the work producing end 17' of the lever means. Also included are fulcrum means 19 which engage the lever means 17 for enabling optimum force to be developed to overcome the resistance offered by the fluid emanating from the severed end of the pipeline 13 and to urge the cap means 15 sealably against the severed end 13' of the pipeline. Further, brace means, as at 21, are included for grasping the pipeline 13 and for fixedly supporting the fulcrum means 19 as the lever means 17 is manually operated.

The device 11 also includes lock means, as at 23, for locking the lever means 17 in a rigid position subsequent to the cap means 15 being sealably urged against the severed end of the pipeline 13.

The brace means 21 includes pipeline grasping means, as at 25, for grasping the pipeline 13 and at least one but preferably a pair of linkage arm members, as at 27, 29 shown in FIG. 2, which are ganged together in a side by side relationship and are interposed between the fulcrum means 19 and the pipeline grasping means 25. From FIG. 2 of the drawing it may be seen that the respective linkage arm members 27, 29 have proximal ends 27', 29' and distal ends 27'', 29'' thereto. From FIG. 1 of the drawing it may be seen that the fulcrum means 19 includes first pivot means, as at 33, for pivotally connecting the lever means 17 to the distal ends 27'', 29'' of the linkage arm members. The proximal ends 27', 29' of the linkage arm members are attached to the pipeline grasping means 25 in a manner about to be described. In constructing the device 11 for a specific size pipeline, the proximal ends 27', 29' of the linkage arm members may simply be fixedly attached to the pipeline grasping means 25 in any well known manner as by welding or the like.

However, the preferred concept of the present invention is to include structure which provides versatility in attaching the device 11 to various different size pipelines 13. More specifically, second pivot means, as at 35, are included for pivotally connecting the proximal ends 27', 29' of the linkage arm members to the pipeline grasping means 25, thus facilitating attaching the device 11 to various different size pipelines 13. Accordingly, movement of the linkage arm members 27, 29 about the second pivot means 35 is effective to move, i.e., raise and lower as shown in FIG. 1, the cap means 15 toward and away from the pipeline 13. This is an important feature of the present invention and it is significant to note that the second pivot means 35 is disposed a greater distance from the pipeline 13 than is the first pivot means 33.

The pipeline grasping means 25 includes first and second substantially vertically disposed parallel spaced apart plate like bite members 37, 39 respectively provided with upwardly and downwardly directed wedge shaped notches, as at 41, 43 for receiving the respective lower and upper portions of the rigid pipeline 13. The pipeline grasping means 25 also includes an inclined extending member 45, as best viewed in FIG. 1 of the drawing. The first and second bite members 37, 39 are fixedly attached to the remote ends of the inclined extending member 45 in any well known manner, as by welding or the like. From FIG. 1 of the drawing it may be seen that the first plate like bite member 37 is disposed somwhat lower than the second plate like bite member 39, i.e., assuming the pipeline 13 is to be disposed substantially horizontal as depicted.

The pipeline grasping means 25 also includes stanchion means 47 as best viewed in FIGS. 1 and 5 of the drawing, for supporting the second pivot means 35 a greater distance from the pipeline 13 than is the first pivot means 33. The second plate like bite member 39 is fixedly attached to the lower end of the stanchion means 47 and the upper end of the stanchion means carries the second pivot means 35. The angular relationship between the stanchion means 47 and the bite member 39 preferably is such that the stanchion means 47 assumes a somewhat perpendicular relationship with the pipeline 13 when suitably engaged therewith, i.e., substantially as depicted in FIG. 1 of the drawing.

It should be understood that the first and second bite members 37, 39 are rigidly joined one to the other and the respectively upwardly and downwardly directed notches 41, 43 establish pipeline biting portions 37', 39' as clearly shown in FIG. 5 of the drawing. Additionally, the first pivot means 33 is disposed a predetermined spaced distance from the cap means 15 to establish the fulcrum means 19. Further, the stanchion means 47 preferably includes a pair of stanchion members 49, 51 as depicted in FIGS. 2 and 5 of the drawing. The stanchion members 49, 51 are ganged together in a side by side relationship for supporting the second pivot means 35 in the above described manner.

Stated another way, the stanchion members 49, 51 support the linkage arm members 27, 29 in a disposition wherein the longitudinal axes of the linkage arm members 27, 29 and the pipeline 13 extend convergingly toward the cap means 15. Additionally, the first and second bite members 37, 39 in conjunction with the stanchion members 49, 51 and the linkage arm members 27, 29 jointly fixedly support the fulcrum means 19 as the lever means 17 is manually operated.

The lock means 23 alluded to above includes a sleeve member 53 slidably engaging the lever means 17. Additionally, thumb screw means 55 is included which threadedly engages the sleeve member 53 in a well known manner for jam engaging the lever means 17 to selectively prevent relative sliding movement of the sleeve member 53. The lock means 23 also includes a lock bar member 57 which has one end thereof, as at 57' pivotally supported by the second pivot means 35. Also included are third pivot means 59 for pivotally connecting the end, as at 57'', of the lock bar member 57 which is remote from the one end 57' thereof to the sleeve member 53 through pieces 54 which carry the pivot means 59 and are fixedly attached to sleeve member 53 as by welding or the like. Accordingly, from FIGS. 1, 2 of the drawing it may readily be seen that the linkage arm members 27, 29, the lock bar member 57, and a portion of the lever means, as at 17'', define a rigid triangle 61 as the cap means 15 suitably engages the severed end 13' of the rigid pipeline.

It should be understood that the sleeve member 53 is free to slide along the lever means 17, i.e., assuming the thumb screw 55 to be loose. Accordingly, when operating the lever means 17 in the intended manner, i.e., the free end thereof being forced in a clockwise direction as viewed in FIG. 1, the sleeve member 53 is caused to slide downwardly to a position clearly depicted in FIG. 4 in broken lines and characterized therein by the numeral 53'. Therefore, subsequent to the severed end 13' of the pipeline being sealed by the cap means 15, the thumb screw means 55 is threadedly driven inwardly to assume a jam engagement with the lever means 17. Thus, the lever means 17 is locked in a rigid position and the device 11 may be unattended thereafter for an indefinite period of time until further appropriate well known measures are taken to effect permanent repair to the pipeline 13.

The cap means 15 includes a cap member 63 having a circular socket, as at 65 provided therein. The cap means 15 also includes resilient seal means, as at 67 in FIG. 3 of the drawing, which is disposed within the socket 65 for sealably engaging the severed end 13' of the pipeline.

Although the invention has been described and illustrated with respect to a preferred embodiment thereof, it is to be understood that it is not to be so limited since changes and modifications may be made therein which are within the full intended scope of the invention.

I claim:

1. An obturator device for rapid sealable engagement with a severed active fluid delivery rigid pipeline, said device comprising cap means for sealably engaging the severed end of the rigid pipeline, lever means for applying leverage to said cap means, said cap means being fixedly attached to the work producing end of said lever means, first and second rigidly joined bite members respectively including upwardly and downwardly directed pipeline biting portions for respectively frictionally engaging lower and upper portions of the pipeline, a linkage arm member, first pivot means for pivotally connecting one end of said linkage arm member to said lever means, said first pivot means being disposed a predetermined spaced distance from said cap means to establish fulcrum means for enabling optimum force to be developed to overcome the resistance offered by the fluid emanating outwardly from the severed end of the pipeline and to urge said cap means sealably against the severed end of the pipeline, and stanchion means attached to an end of said linkage arm member which is remote from said one end thereof for supporting said linkage arm member in a disposition wherein the longitudinal axes of said linkage arm member and the pipeline extend convergingly toward said cap means; said first and second bite members, in conjunction with said stanchion means and said linkage arm member, jointly fixedly supporting said fulcrum means as said lever means is manually operated.

2. The obturator device of claim 1 in which is included lock means for locking said lever means in a rigid position subsequently to said cap means being sealably urged against the severed end of the pipeline.

3. An obturator device for rapid sealable engagement with a severed active fluid delivery rigid pipeline, said device comprising cap means for sealably engaging the severed end of the pipeline, lever means for applying leverage to said cap means, said cap means being fixedly attached to the work producing end of said lever means, fulcrum means engaging said lever means for enabling optimum force to be developed to overcome the resistance offered by the fluid emanating from the severed end of the pipeline and to urge said cap means sealably against the severed end of the pipeline, and brace means for grasping the pipeline and for fixedly supporting said fulcrum means as said lever means is manually operated, said brace means including pipeline grasping means for grasping the pipeline and a linkage arm member, said linkage arm member being interposed between said fulcrum means and said pipeline grasping means, said linkage arm member having proximal and distal ends thereto, said fulcrum means including first pivot means for pivotally connecting said lever means to the distal end of said linkage arm member, the proximal ends of said linkage arm member being attached to said pipeline grasping means, said obturator device including second pivot means for pivotally connecting the proximal end of said linkage arm member to said pipeline grasping means to facilitate attaching said obturator device to various different size pipelines, movement of said linkage arm member about said second pivot means being effective to move said cap means toward and away from the pipeline, said pipeline grasping means including first and second substantially vertically disposed parallel spaced apart plate like bite members respectively being provided with upwardly and downwardly directed wedge shaped notches for receiving the respective lower and upper portions of the rigid pipeline, an incline extending member, said first and second bite members being fixedly attached to the remote ends of said incline extending member with said first plate like bite member being disposed somewhat lower than said second plate like bite member, and stanchion means for supporting said second pivot means a greater distanace from the pipeline than is said first pivot means, said second plate like bite member being fixedly attached to the lower end of said stanchion means with the upper end of said stanchion means carrying said second pivot means.

4. The obturator means of claim 3 in which said lock means includes a sleeve member slidably engaging said lever means, thumb screw means threadedly engaging said sleeve member for selectively jam engaging said lever means to prevent relative sliding movement of the sleeve member, a lock bar member having one end thereof pivotally supported by said second pivot means; and third pivot means for pivotally connecting the end of said lock bar member which is remote from said one end thereof to said sleeve member whereby said linkage arm member, said lock bar member, and a portion of said lever means define a rigid triangle as said cap means sealably engages the severed end of the rigid pipeline.

* * * * *